United States Patent [19]

Osman

[11] Patent Number: 4,993,244
[45] Date of Patent: Feb. 19, 1991

[54] LOCKING APPARATUS FOR A CELLULAR PHONE

[76] Inventor: Craig Osman, 6447 Miami Lakes Dr. East, #212, Miami Lakes, Fla. 33014

[21] Appl. No.: 520,764

[22] Filed: May 9, 1990

[51] Int. Cl.5 .............................................. E05B 73/00
[52] U.S. Cl. ............................................. 70/30; 70/58; 70/159; 70/258; 70/DIG. 72; 379/58; 455/90
[58] Field of Search .................... 70/DIG. 72, 30, 49, 70/58, 158–162, 258; 379/445, 453, 451, 58; 455/90

[56] References Cited

U.S. PATENT DOCUMENTS

| | | | |
|---|---|---|---|
| 2,615,322 | 10/1952 | Gazda | 70/62 |
| 2,716,882 | 9/1955 | Gill et al. | 70/DIG. 58 X |
| 3,391,256 | 7/1968 | Nawman | 70/DIG. 72 X |
| 3,664,163 | 5/1972 | Foote | 70/58 |
| 3,824,465 | 7/1974 | Blough | 455/35 X |
| 3,859,826 | 1/1975 | Singer et al. | 70/58 |
| 3,899,647 | 8/1975 | Nachsi et al. | 379/455 |
| 4,005,279 | 1/1977 | Richter | 379/455 |
| 4,057,697 | 11/1977 | Addoo | 70/DIG. 72 X |
| 4,937,860 | 6/1990 | Smith | 379/455 |

FOREIGN PATENT DOCUMENTS

| | | | |
|---|---|---|---|
| 1098782 | 1/1968 | United Kingdom | 379/58 |
| 2188361 | 9/1987 | United Kingdom | 70/58 |

Primary Examiner—Lloyd A. Gall
Attorney, Agent, or Firm—Malloy, Downey & Malloy

[57] ABSTRACT

An apparatus for the locking attachment of a mobile, cellular phone in a secure position such as being attached to a floor or like supporting surface within a vehicle to prevent unauthorized removal of the phone but still allow freedom of use and ease of removal of the phone from the locking apparatus or the locking apparatus from its attachment to a supporting surface when it is desired to transport the phone with a user from one location to another.

14 Claims, 1 Drawing Sheet

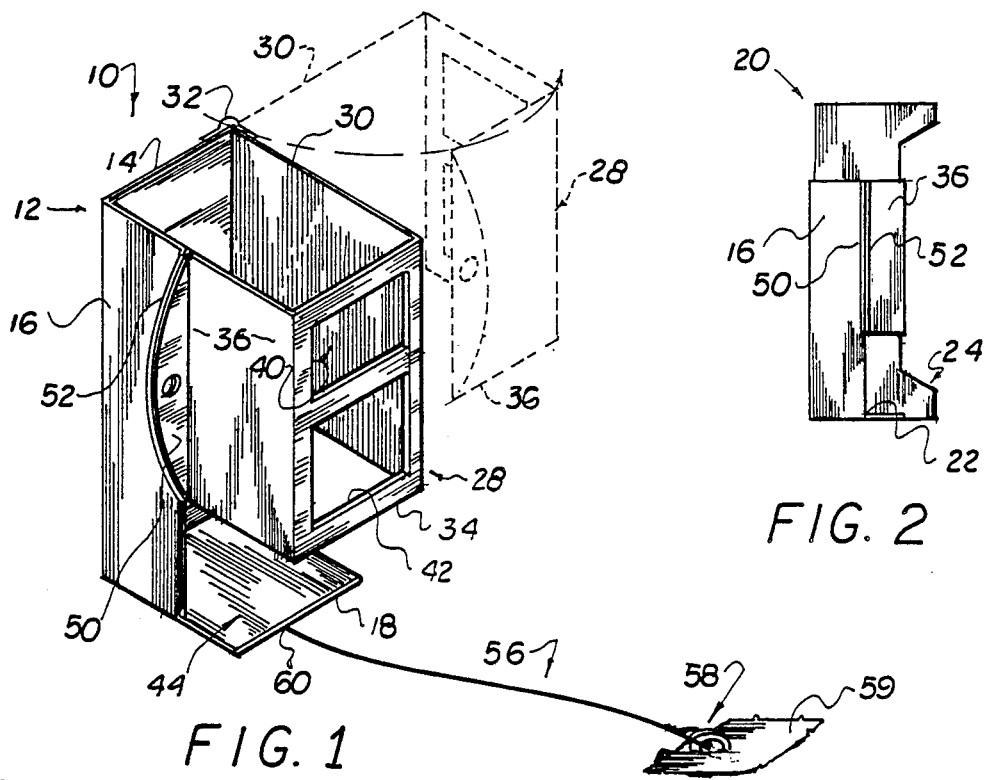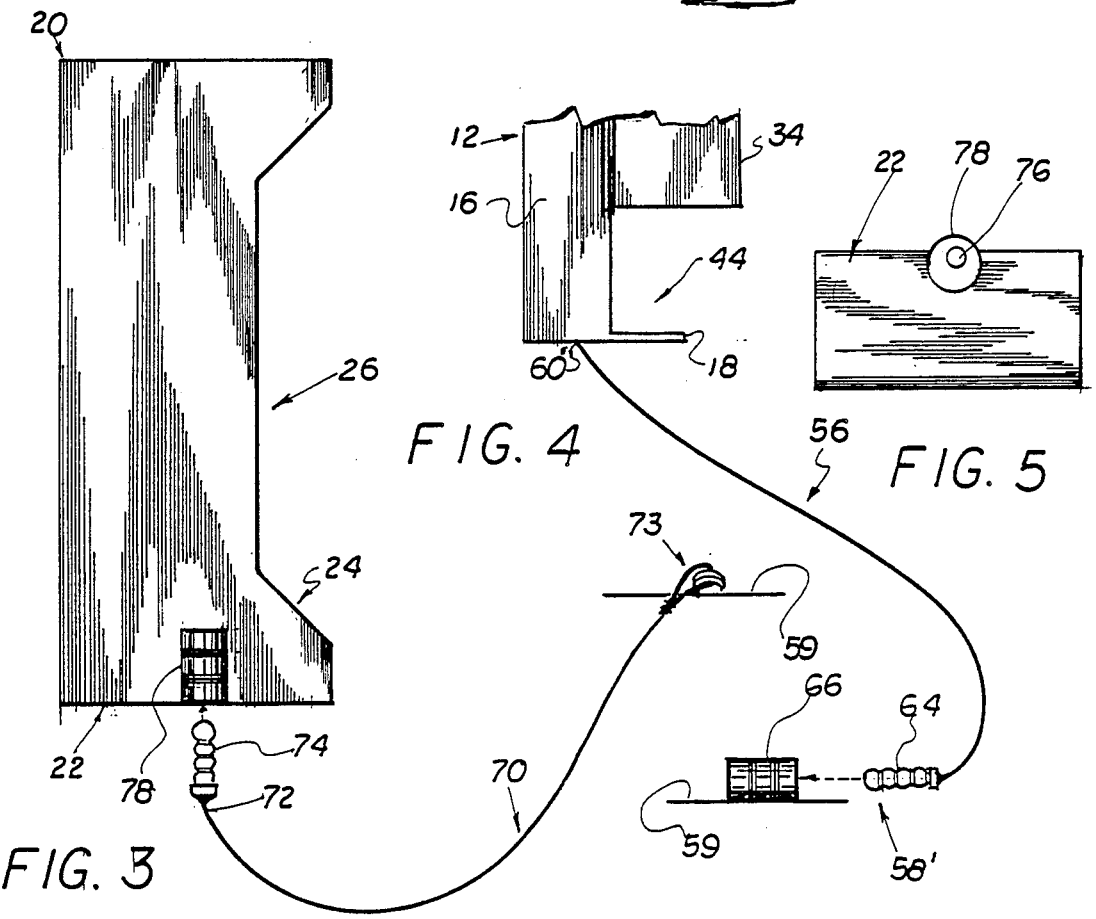

LOCKING APPARATUS FOR A CELLULAR PHONE

BACKGROUND OF THE INVENTION

1. Field of the Invention

This invention relates to a locking assembly or structure specifically adapted to mount a mobile, cellular-type phone in a secured position on or to a supporting surface such as but not limited to the floor or other portions of an automobile or like vehicle.

2. Description of the Prior Art

The concept of providing locks or like securement devices for telephones is, of course, well known in the patented art and also such devices are believed to be commercially available. Existing prior art devices are represented in a plurality of various structural designs specifically adapted to perform an intended function dependent to a great extent on the overall size, configuration, and type of telephone being secured. For example, U.S. Pat. Nos. 3,469,041 to Winston, and 4,750,204 to Bartley, are both directed towards locking structures adapted to be used with substantially conventional non-portable telephone hand sets. Bartley is primarily concerned with the protection against unauthorized use by including a barrier portion which overlies and effectively covers a press button dial portion of the phone. Winston, on the other hand, is directed to a structure which is adapted to prevent use of the hand portion in order to prevent use of the phone.

Other prior art structures are represented in the U.S. Pat. Nos. to Gazda, 2,615,322; Blough, 3,824,465; and Suzaki, 4,713,836. These structures are primarily designed for the securement, shielding, or otherwise secured attachment of mobile-type phones to prevent removal and/or unauthorized use.

Alley, III, U.S. Pat. No. 3,625,031, discloses an apparatus for preventing theft of portable articles from a vehicle incorporating an elongated cord attached at least at one end to a locking structure associated with an attachment bracket or like member. Similarly, U.S. Pat. Nos. to Leeper, 3,595,041; Porter, 4,047,686; and Cykman, 4,862,715 all disclose mounting brackets or casings for the protection of portable articles from theft or unauthorized removal from a vehicle utilizing some type of encasement or housing normally disposed in a locked position by some type of exterior or supplementary locking structure such as but not limited to a padlock. These patents are not specifically directed to the protection of a portable or cellular-type phone but are included as being representative of locking or securement apparatus in general.

The structures represented in the above-noted patent show a wide variety of structural designs in configurations specifically adapted to various types of telephones as well as other portable objects. There is still a need in the industry for a locking apparatus or like securement device specifically adapted for a portable, cellular phone which prevents the unauthorized removal of such phone from a predetermined location and also prevents removal of the battery from the phone casing.

SUMMARY OF THE INVENTION

This invention relates to a lock assembly designed to be used to secure and prevent removal of a portable, cellular-type phone from a given location such as but intentionally not limited to the interior of an automobile or like vehicle. The assembly comprises, in a preferred embodiment to be described in greater detail hereinafter, a base portion having two elongated wall portions sufficient in length to extend along at least a majority of the length of the cellular phone to which it is intended to be connected. In addition, a cover is hingedly or otherwise movably attached to the base and is configured to include a plurality of wall segments also elongated. The cover, due to the movable connection between itself and the base, is capable of being selectively disposed between an opened and a closed position. The closed position is more particularly defined by the two wall portions of the base and the plurality of wall segments of the cover being disposed in overlying relation to correspondingly positioned side or surfaces of the phone.

In addition, a locking means is provided for the securement of the cover to the base in the closed position. This will prevent unauthorized removal of the phone, when engaged by the cover and base in the closed position, from its intended location such as within the interior of a vehicle. The locking means may take a variety of structural configurations but in one preferred embodiment, the locking means includes two locking mounts. Each mount is formed on corresponding or substantially mating portions of the cover and base, respectively. Further, the lock mounts are adapted to supportingly receive a supplementary lock thereon so as to lockingly interconnect the mounts to one another and ensure that the cover and base would be maintained in their closed, substantially surrounded position relative to the phone being protected.

While the type of lock utilized may vary, the lock mounts are particularly adapted for a supplementary-type lock such as a padlock or portable combination lock.

A "built in" combination-type lock including a tongue and receiving-type channel or slot may also be incorporated as a permanent part of the cover and/or base portion. Alternately, yet another embodiment to be described in greater detail hereinafter is a combination lock or like lock assembly secured to a supporting surface such as a floor or like location within a vehicle. An elongated flexible and high strength, cut resistant cable may be permanently or fixedly attached to the base and/or shield portion of the subject assembly wherein the lock may be secured to the supporting surface and the outermost or distal end of the connecting cord or cable attached to the base is structurally adapted to be removably connected to the lock associated and/or mounted to the floor of the vehicle.

Another feature of the present invention comprises the provision of a shield secured to a lowermost end of the base and extending outwardly therefrom in transverse relation to the length of aforementioned wall portions. The shield structure is disposed to effectively engage and definitely cover or overly a bottom most end of the cellular phone being protected. In particular, the shield is dimensioned and configured to cover and thereby prevent access to any opening or cover structure associated with the housing of a battery used to power the phone during its operation. It is well recognized that the batteries themselves are frequently of great value and, of course, interchangable. Therefore, if unauthorized personnel are prevented from removing cellular phones from their intended location, such personnel frequently resort to the removal of the battery portion from the phone housing or casing.

Other structural features include an apertured construction in one wall segment which normally is disposed to overly the dialing pad of the phone. Also, the relative dimensions and configurations of the cover and base are such as to provide clear, unobstructed access to the speaker portion of the phone casing thereby preventing interference with the intended use of the phone even when the locking apparatus of the present invention is in its closed position about the phone.

BRIEF DESCRIPTION OF THE DRAWINGS

For a fuller understanding of the nature of the present invention, reference should be had to the following detailed description taken in connection with the accompanying drawings, in which:

FIG. 1 is a perspective view of one preferred embodiment of the present invention in partial phantom.

FIG. 2 is a side view of the embodiment of FIG. 1 wherein the assembly is mounted on a cellular phone.

FIG. 3 is a side view of yet another embodiment of the present invention.

FIG. 4 is a side view and partial cutaway showing yet another embodiment of the present invention similar to FIG. 1.

FIG. 5 is a rear view of the embodiment of FIG. 3.

Like reference numerals refer to like reference parts throughout the several views of the drawings.

DETAILED DESCRIPTION OF THE PREFERRED EMBODIMENT

As shown in FIGS. 1, 2, and 4, one preferred embodiment of the present invention is generally indicated as 10 and comprises a base generally indicated as 12 including a first wall portion 14 and a second wall portion 16 both having an elongated configuration and being fixedly attached to one another in substantially transverse relation. A shield 18 is fixedly secured to a lower end of both the first and second wall portions 14 and 16 and extends outwardly therefrom a predetermined distance in order to cover at least a majority or an access portion of a phone housing generally indicated as 20. The shield is specifically provided in covering relation to the bottom portion of the phone as at 22 (see FIG. 3) so as to prevent access to the battery mounted within the phone housing 20 and unauthorized removal thereof when the assembly indicated in FIG. 1 and 2 is in its closed position as shown.

The phone 20 is, of course, a cellular, portable-type phone and includes generally a speaker area or portion generally indicated as 24 and a dial area or portion generally indicated as 26. It should be emphasized that the cellular phone 20, per se, is not a part of the present invention, but does represent the type of phone for which the subject lock assembly 10 is designed to secure.

Another feature of the present invention includes the provision of a cover 28 including a first wall segment 30 pivotally connected to the first wall portion 14 of the base by a hinge means 32 about correspondingly positioned longitudinal edges as shown. The cover 28 also includes a second wall segment 34 defining a front face of the cover 28. A third wall segment 36 is fixedly secured to the second wall segment 34 and is disposed in substantially parallel to the first wall segment 30 and co-planar relation to the second wall portion 16 of the base.

As shown in FIG. 1, the cover 28 is pivotal about the hinge 32 and thereby selectively positionable between a closed or opened position, the former position being represented in solid lines in FIG. 1.

As also best shown in FIG. 1, the second wall segment 34 representing the front face of the cover 28 is apertured as at 40 and 42 in order to provide clear access to the user of the press button dial portion of the cellular phone 20.

It should be further noted that the length of the elongated wall portions 14 and 16 is greater than the length of the elongated wall segments 30, 34, and 36. This allows an opening or spacing as at 44 to exist between the lower end of the cover end 28 and the shield 18. This opening or spacing 44 allows the speaker portion 24 to be readily accessible to the user when he is speaking into the phone 20 without interference of any structural portion of the lock assembly 10. A lock means may be provided in the form of two lock mounts 50 and 52 defined by outwardly extending flanges each secured to what may be considered a free longitudinal edge of the second wall portion 16 and the third wall segment 36. These lock mounts 50 and 52 are disposed in immediately adjacent, engaging and parallel relation to one another as shown in FIGS. 1 and 2 when the assembly is in its closed position. Both the mounts 50 and 52 have apertures which are aligned to receive a portable lock structure such as but not limited to a padlock, combination lock, etc.

An attachment means generally indicated as 56 in the form of an elongated high-strength, cut resistant cord of flexible material having a distal end as at 58 secured to a supporting surface or floor portion of a vehicle or other structure as at 59 to which the phone 20 is intended to be secured.

In the embodiment of FIG. 1, the cord 56 may be permanently attached as by welding or the like to the shield 18 and also may be somewhat permanently anchored at its distal end 58 to the support surface 59. However, in the embodiment of FIG. 4, the proximal end 60 may be fixedly secured to the shield 18 as at 60' in FIG. 4. The distal end as at 58' includes a locking means including a tongue member 64 designed to fit within a central channel (not shown) of a combination type lock 66. The combination type lock is fixedly and/or permanently attached to the supporting surface 59 as also shown in FIG. 4.

With reference to FIGS. 3 and 5, another embodiment of the present invention comprises an attachment cord 70 having an elongated configuration and formed of the same structure and material as cord 56 in the embodiment of FIG. 4. The proximal end of the cord 70 as at 72 is attached to a lock tongue structure 74 designed to fit within the central channel or receiving sleeve 76 of a combination locking member 78 which is fixedly secured to the housing 20 of the phone adjacent a lowermost end thereof as shown in FIGS. 3 and 5. The opposite or distal end of the cord, 70 as at 73 may be permanently or otherwise anchored to the supporting surface 59 as shown. In each of the embodiments of FIGS. 1, 3, and 4, it should be appreciated that the cord 56 and 70, respectively, has sufficient flexibility and longitudinal dimension to allow use of the phone 20 in the conventional manner while it is still attached by the respective cords 56 and 70 to the supporting surface 59.

Now that the invention has been described,

What is claimed is:

1. A lock assembly for a portable phone powered by a self-contained battery structure, said assembly comprising:

a. a base including a first and a second elongated wall portion disposed in substantially transverse relation to one another and oriented to overly a rear portion and one side portion respectively of the phone when attached thereto, b. a shield member secured at one end of said base and dimensioned to extend transversely outward from both said wall portions, c. said shield member disposed and configured to overly and cover a lower end of the phone and access to the battery therein, d. a cover movably connected to said base and disposable into a closed position defined by overlying, covering relation of said cover to a front portion and an opposite side portion of the phone while said base is disposed in overlying relation to said rear portion and said one side portion respectively of the phone, e. lock means mounted in part on both said base and said cover and disposed and structured for locking connection of said base and said cover in said closed position, f. said cover comprising an outer exposed face having an apertured construction defined by at least one access opening overlying a dial portion of the phone when said cover and said base are in said closed position.

2. An assembly as in claim 1 wherein said cover comprises at least a first and a second elongated wall segment fixedly mounted in substantially transverse relation to one another and pivotally connected to said base and movable in a path of travel substantially transverse to the length of the phone into and out of said closed position.

3. An assembly as in claim 2 wherein said first wall portion and said first wall segment are pivotally connected to one another along correspondingly disposed longitudinal edges and said lock means is mounted on correspondingly disposed free longitudinal edges of said base and cover.

4. An assembly as in claim 2 wherein said cover comprises a third wall segment fixed in transverse relation to said second wall segment in substantially parallel relation to said first wall segment.

5. An assembly as in claim 4 wherein said first and second wall portions of said base are cooperatively disposed with said first, second, and third wall segments of said cover to define a substantially rectangular transverse cross-sectional configuration collectively of said base and said cover when in said closed position.

6. An assembly as in claim 4 wherein correspondingly positioned longitudinal edges of said base and said cover are pivotally attached to one another, substantially oppositely disposed free longitudinal edges of said base and said cover are disposed in immediately adjacent position and connected by said lock means when said base and cover are in said closed position.

7. An assembly as in claim 6 wherein said free longitudinal edges are each disposed on different ones of said second wall portions and said third wall segments, respectively.

8. An assembly as in claim 7 wherein said lock means comprises two lock mounts each secured to a different one of said free longitudinal edges on said second wall portion and said third wall segment, respectively, and said lock means further comprising a lock structure secured to and interconnecting said lock mounts and lockingly securing said base and said cover into said closed position.

9. An assembly as in claim 7 wherein said second wall portion and said third wall segment are disposed in substantially co-planar relation to one another and in parallel relation to said first wall segment and said first wall portion and said second wall segment are disposed in parallel relation when said cover and said base are in said closed position.

10. An assembly as in claim 1 wherein said cover comprises a lower end portion disposed in spaced relation to said shield member and in non-covering relation to a speaker portion of the phone.

11. An assembly as in claim 1 wherein said shield member is fixedly secured to a support surface, said base and said cover being disposed in a substantially vertically oriented, upright position.

12. An assembly as in claim 8 wherein said lock structure is a portable lock and said lock mounts are outwardly extending substantially planar flanges disposed in abutting parallel relation to one another, said flanges being adapted to concurrently receive the portable lock thereon when said cover and said base are in said closed position.

13. An assembly as in claim 1 further comprising attachment means including an elongated cord formed of a flexible, high strength material resistant to cutting along its length, said cord including a distal end secured to a supporting surface and extending outwardly therefrom, and a proximal end oppositely disposed to said distal end and structurally adapted to be secured to a portion of said lock assembly.

14. An assembly as in claim 13 wherein said proximal end is fixedly secured to a lower end of said lock assembly and said distal end has a locking means attached in part thereto, said locking means including a locking portion secured to said distal end and a second locking portion fixedly mounted on said supporting surface, said first and second locking portion removably attachable to one another.

* * * * *